(12) United States Patent
Gignoux et al.

(10) Patent No.: US 9,121,435 B2
(45) Date of Patent: Sep. 1, 2015

(54) ANTI-ROTATION DEVICE FOR A LARGE SIZE NUT

(75) Inventors: Hervé Gignoux, Vaux le Penil (FR); Philippe Gérard Edmond Joly, Vaux le Penil (FR); Romain Jean-Louis Robert Thory, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/232,212

(22) PCT Filed: Jul. 13, 2012

(86) PCT No.: PCT/FR2012/051671
§ 371 (c)(1),
(2), (4) Date: Jan. 10, 2014

(87) PCT Pub. No.: WO2013/014359
PCT Pub. Date: Jan. 31, 2013

(65) Prior Publication Data
US 2014/0140787 A1    May 22, 2014

(30) Foreign Application Priority Data
Jul. 22, 2011   (FR) ...................................... 11 56707

(51) Int. Cl.
*F16B 39/04*   (2006.01)
*F16B 39/10*   (2006.01)

(52) U.S. Cl.
CPC ...................................... *F16B 39/10* (2013.01)

(58) Field of Classification Search
CPC ....................................................... F16B 39/10
USPC ......................................... 411/216, 217, 190
See application file for complete search history.

(56) References Cited

U.S. PATENT DOCUMENTS

| | | | | |
|---|---|---|---|---|
| 1,240,046 A | * | 9/1917 | Hubener | 411/190 |
| 1,431,459 A | * | 10/1922 | Hardie | 411/221 |
| 1,440,938 A | * | 1/1923 | Sieroslawski | 411/221 |
| 1,491,163 A | * | 4/1924 | Osenkowski | 411/221 |
| 1,613,493 A | * | 1/1927 | Turner et al. | 411/225 |
| 1,755,807 A | * | 4/1930 | Boles | 411/221 |
| 3,190,334 A | * | 6/1965 | Wigam | 411/131 |
| 5,674,034 A | * | 10/1997 | Bennett | 411/197 |

(Continued)

FOREIGN PATENT DOCUMENTS

| | | |
|---|---|---|
| FR | 2 739 904 | 4/1997 |
| GB | 878058 | 9/1961 |

OTHER PUBLICATIONS

International Search Report as issued for International Application No. PCT/FR2012/051671, dated Nov. 6, 2012.

*Primary Examiner* — Gary Estremsky
(74) *Attorney, Agent, or Firm* — Pillsbury Winthrop Shaw Pittman LLP

(57) ABSTRACT

An anti-rotation device for a nut in tightened position on a male part, includes a plurality of upper notches provided on one end of the nut, the upper notches extending along a longitudinal axis of the nut, a plurality of lower notches provided in one peripheral zone of the male part, the lower notches extending along a longitudinal axis of the male part, and the lower and higher notches at least partially overlapping when the nut is in tightened position on the male part, a ring including at least one locking component accommodated both in one of the lower notches of the male part and in one of the higher notches of the nut.

17 Claims, 1 Drawing Sheet

(56) References Cited

U.S. PATENT DOCUMENTS

| | | | |
|---|---|---|---|
| 5,772,373 A * | 6/1998 | Cronin et al. | 411/120 |
| 6,095,735 A * | 8/2000 | Weinstein et al. | 411/221 |
| 7,927,052 B1 | 4/2011 | Varden | |
| 2006/0233627 A1 * | 10/2006 | Weinstein | 411/369 |

* cited by examiner

ANTI-ROTATION DEVICE FOR A LARGE SIZE NUT

CROSS REFERENCE TO RELATED APPLICATIONS

This application is the U.S. National Stage of PCT/FR2012/051671, filed Jul. 13, 2012, which in turn claims priority to French Patent Application No. 1156707, filed Jul. 22, 2011, the entire contents of all applications are incorporated herein by reference in their entireties.

TECHNICAL FIELD OF THE INVENTION

The present invention relates to an anti-rotation device for a nut tightened on a male part, for example a nut tightened on a turbine blade of an aircraft engine. The technical field of the invention is, generally speaking, that of anti-rotation devices for nuts of large diameter.

TECHNOLOGICAL BACKGROUND OF THE INVENTION

In order to prevent the rotation of a nut after tightening on a male part, an anti-rotation device must be integrated. Certain nuts of small size of the prior art have self-locking, but self-lockings are not adapted to nuts of large size. In fact, self-lockings are only available on nuts of 4 to 15.875 millimeters diameter.

Certain solutions of the prior art thus propose an anti-rotation function by collaboration between a finger and notches. For example, on the CFM56 aircraft engine, the anti-rotation function of a nut tightened on a turbine blade is assured via a ventilation tube situated inside the turbine blade. A finger is in fact installed on the ventilation tube, and accommodated in notches of the nut and the blade, then preventing the nut rotating around the blade. The ventilation tube being centred in several places, a tilting of the finger is impossible.

However, certain aircraft engines, for example the SilverCrest, do not have ventilation tubes inside the turbine blades, and more generally the male parts do not necessarily have a part installed inside the male part, on which to install a finger.

GENERAL DESCRIPTION OF THE INVENTION

The subject matter the invention offers an anti-rotation device for a nut of large size tightened on a male part, not requiring that a part has to be installed beforehand inside the male part, and that a finger is fixed on said part.

According to a first aspect, the invention thus essentially relates to an anti-rotation device for a nut in tightened position on a male part, said male part being hollow at least at a peripheral zone, the device being characterised in that it comprises:
- a plurality of upper notches provided at one end of the nut, said upper notches extending along a longitudinal axis of the nut,
- a plurality of lower notches provided in the peripheral zone of the male part, said lower notches extending along a longitudinal axis of the male part, and said lower and upper notches overlapping at least partially when the nut is in tightened position on the male part,
- a ring installed inside the peripheral zone of the male part, said ring comprising at least one long finger accommodated both in one of the lower notches of the male part and in one of the upper notches of the nut.

Thanks to the device according to the invention, the long finger of the ring prevents the rotation of the nut.

Apart from the main characteristics that have been mentioned in the preceding paragraph, the annular shroud according to the invention may have one or more complementary characteristics among the following, considered individually or according to technically possible combinations thereof:
- the ring further comprises at least two short fingers, each short finger being accommodated in one of the lower notches. The short fingers balance the ring and stop it tilting.
- the ring comprises four short fingers, each short finger being accommodated in a lower notch. This number makes it possible to optimise the balancing of the ring.
- the number of lower notches is prime with the number of upper notches. Thus, the number of combinations of positions of the nut in which an upper notch is aligned with a lower notch is maximised, which reduces the overtorque to apply during the alignment of a lower notch with an upper notch, and thus relieves the structure.
- the lower notches and the upper notches have same length. The position of the ring is then more stable.
- the lower notches and the upper notches have same width. The anti-rotation device is then optimised because no clearance exists between the ring and the notches.
- the bases of the lower notches and the bases of the upper notches are aligned along the longitudinal axis when the nut is in tightened position. The position of the ring is then more stable.
- only an upper notch and a lower notch are positioned to receive the long finger when the nut is in tightened position.

According to second aspect, the invention relates to an aircraft engine comprising the anti-rotation device for a nut in tightened position on a male part according to the invention.

The invention and its different applications will be better understood on reading the description that follows and by examining the figures that accompany it.

BRIEF DESCRIPTION OF THE DRAWING

The figures are only presented for indicative purposes and in no way limit the invention.

The figures show.

DETAILED DESCRIPTION OF AT LEAST ONE EMBODIMENT OF THE INVENTION

Figure 1:
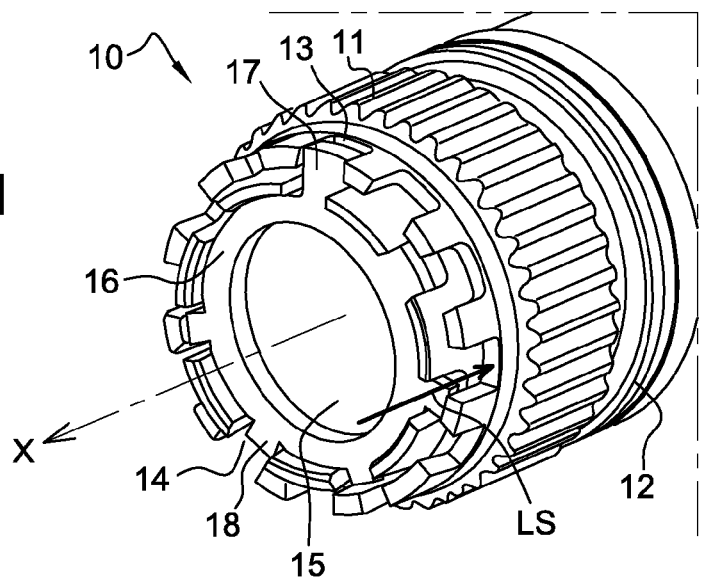
In FIG. 1, a schematic representation of an anti-rotation device for a nut tightened on a turbine blade of an aircraft engine, according to an embodiment of the invention.
Figure 3:
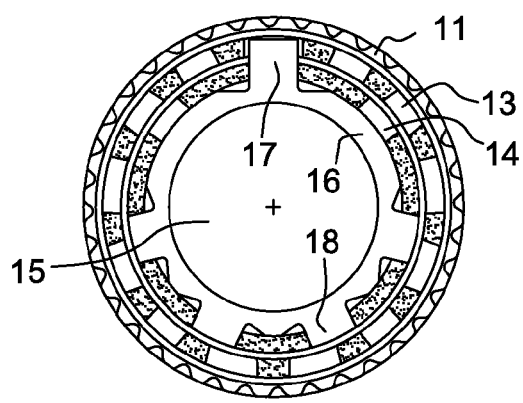
In FIG. 3, a frontal view of the device of FIG. 1.

FIGS. 1 and 3 are schematic representations of an anti-rotation device 10 for a nut 11 tightened on a turbine blade 12 of an aircraft engine, according to an embodiment of the invention. In this blade 12/nut 11 assembly, the nut 11 constitutes the female part, and the blade 12 constitutes the male part. The blade 12 is cylindrical and extends along a longitudinal axis X. The nut also extends along a longitudinal axis which is, in tightened position on the blade 12, merged with the X axis. Furthermore, the blade 12 is hollow at least at a peripheral zone 15.

The blade 12 comprises a plurality of notches, which will be called lower notches 14. The lower notches 14 are provided in the peripheral zone 15 of the blade 12 and extend along the longitudinal axis X over a length Li. The nut 11 also comprises a plurality of notches, which will be called upper notches 13. The upper notches 13 are provided on one end of the nut 11, and extend along the longitudinal axis of the nut 11 over a length Ls. The number of lower notches 14 is not a priori equal to the number of upper notches 13, but in the non-limiting embodiment described the upper notches 13 and the lower notches 14 have same length Li, Ls, and same width.

In tightened position of the nut 11 on the blade 12, the lower notches 14 and the upper notches 13 are overlapping, and at least one upper notch 13 is aligned with a lower notch 14. Overlapping is taken to mean partial or total covering of the lower notches 14 by the upper notches 13, and alignment along the longitudinal axis X of the bases of the lower notches 14 with the bases of the upper notches 13.

When the nut 11 is in tightened position on the blade 12, a ring 16 is 20 installed inside the blade 12. The diameter of the ring 16 is such that the ring hugs the interior shape of the peripheral zone 15 of the blade 12. The ring comprises a long finger 17 accommodated in the aligned lower notch 14 and the upper notches 13. The long finger 17 then prevents the rotation of the nut 11 on the blade 12.

Advantageously, the number of lower notches 14 is prime with the number of upper notches 13. Thus, the number of combinations of positions of the nut 11 in which an upper notch 13 is aligned with a lower notch 14 is maximised, which reduces the overtorque to apply during the alignment of a lower notch 14 with an upper notch 13, and thus relieves the structure.

Figure 2:
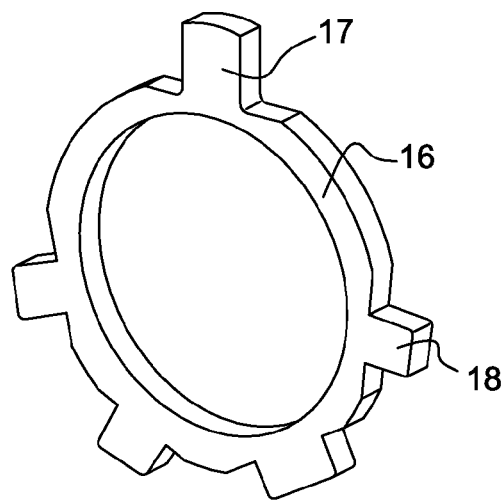
In FIG. 2, a schematic representation of a ring used in the device of FIG. 1.

In the non-limiting embodiment described, the ring 16 further comprises four short fingers 18 accommodated in four lower notches 14 of the blade 12. The short fingers 18 have the necessary and sufficient length to only be accommodated in the lower notches 14. These short fingers 18 make it possible on the one hand to prevent the ring tilting in the blade 12. One then notes that two short fingers 18 suffice to assure the anti-tilt function. Furthermore, a shrewd determination, as represented in FIG. 2, of a number and a position of the short fingers 18 on the ring 16, makes it possible to balance the ring 16, so that no extra weight has to be added to correct a potential unbalance.

The number and the position of the short fingers to be chosen depend on the geometry of the assembly, and in particular on the length of the long finger 17.

The invention is described here above by way of example. It is understood that those skilled in the art are able to make different variants of the device 15 according to the invention, in particular relating to the size and the number of notches, and the number and the arrangement of the fingers, without however going beyond the scope of the invention.

The invention claimed is:

1. Anti-rotation device and a nut in tightened position on a male part, said device comprising:
    a plurality of upper notches provided on one end of the nut, said upper notches extending along a longitudinal axis of the nut,
    a plurality of lower notches provided in a peripheral zone of the male part, wherein the male part is hollow at least at the peripheral zone, said lower notches extending along a longitudinal axis of the male part, and said lower and upper notches at least partially overlapping when the nut is in tightened position on the male part, and
    a ring installed inside the peripheral zone of the male part, the ring comprising at least one locking component accommodated both in one of the lower notches of the male part and in one of the upper notches of the nut.

2. Device according to claim 1, wherein the locking component is a long finger.

3. Device according to claim 1, wherein the ring further comprises at least two short fingers, each short finger being accommodated in a lower notch.

4. Device according to claim 1, wherein the ring comprises four short fingers, each short finger being accommodated in a lower notch.

5. Device according to claim 1, wherein the number of lower notches is prime with the number of upper notches.

6. Device according to claim 1, wherein the lower notches and the upper notches have same length.

7. Device according to claim 1, wherein the lower notches and the upper notches have same width.

8. Device according to claim 1, wherein the bases of the lower notches and the bases of the upper notches are aligned along the longitudinal axis when the nut is in tightened position.

9. Device according to claim 1, wherein only an upper notch and a lower notch are positioned to receive the locking component when the nut is in tightened position.

10. Aircraft engine comprising an anti-rotation device and a nut in tightened position on a male part according to claim 1.

11. An anti-rotation system comprising:
    a nut having an end provided with a plurality of upper teeth and with a plurality of upper notches at a periphery of the nut, each upper notch of the plurality of upper notches formed between two upper teeth of the plurality of upper teeth, said upper teeth and said upper notches extending along a longitudinal axis of the nut;
    a male part having a peripheral zone provided with a plurality of lower teeth and with a plurality of lower notches that extend along a longitudinal axis of the male part, each lower notch of the plurality of lower notches formed between two lower teeth of the plurality of lower teeth, the nut configured to be tightened on the male part, wherein the male part is hollow at least at the peripheral zone, and said lower and upper notches at least partially overlapping when the nut is in tightened position on the male part, and
    a ring arranged to be installed inside the peripheral zone of the male part to prevent a relative rotation of the nut and the male part when the nut is tightened on the male part, the ring comprising at least one locking component to be accommodated both in one of the lower notches of the male part and in one of the upper notches of the nut.

12. The anti-rotation system of claim 11, wherein the locking component is a long finger that extends perpendicularly to the longitudinal axis of the nut and the longitudinal axis of the male part when the nut is tightened on the male part.

13. The anti-rotation system of claim 11, wherein the ring further comprises at least two short fingers, each short finger to be accommodated in a lower notch.

14. The anti-rotation system of claim 11, wherein the lower notches and the upper notches have a same length.

15. The anti-rotation system of claim 11, wherein the lower notches and the upper notches have same width.

16. The anti-rotation system of claim 11, wherein only an upper notch and a lower notch are positioned to receive the locking component when the nut is in tightened position.

17. An aircraft engine comprising an anti-rotation system according to claim 11.

* * * * *